(12) United States Patent
Ekstedt et al.

(10) Patent No.: US 7,773,990 B2
(45) Date of Patent: Aug. 10, 2010

(54) AVOIDANCE OF SERVICE INTERRUPTIONS IN VISITED PUBLIC LAND MOBILE NETWORK (VPLMNS)

(75) Inventors: Tomas Ekstedt, Lund (SE); Magnus Karlsson, Lund (SE); Johan Hokfelt, Lund (SE); Jan Wichert, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1128 days.

(21) Appl. No.: 11/351,222

(22) Filed: Feb. 9, 2006

(65) Prior Publication Data

US 2006/0264215 A1 Nov. 23, 2006

Related U.S. Application Data

(60) Provisional application No. 60/683,667, filed on May 23, 2005.

(51) Int. Cl.
*H04W 4/00* (2009.01)
(52) U.S. Cl. .............. 455/435.3; 455/435.1; 455/435.2; 455/434; 455/432.1; 455/450
(58) Field of Classification Search .............. 455/435.3, 455/435.1, 434, 432, 450, 432.1
See application file for complete search history.

(56) References Cited

U.S. PATENT DOCUMENTS

| | | | |
|---|---|---|---|
| 5,937,351 A | 8/1999 | Seekins et al. | |
| 6,223,042 B1 | 4/2001 | Raffel | |
| 6,389,283 B1 | 5/2002 | Sanchez Herrero | |
| 6,529,732 B1 | 3/2003 | Vainiomaki et al. | |
| 6,693,894 B1 | 2/2004 | Andersson et al. | |
| 2002/0119774 A1 | 8/2002 | Johannesson et al. | |
| 2004/0224689 A1* | 11/2004 | Raghuram et al. | 455/435.3 |
| 2005/0058116 A1* | 3/2005 | Palin et al. | 370/345 |
| 2005/0176427 A1* | 8/2005 | Roberts | 455/434 |

FOREIGN PATENT DOCUMENTS

WO WO 2004/014101 A2 2/2004

OTHER PUBLICATIONS

3GPP Technical Specification (TS) 23.122, V6.4.0, Technical Specification Group Core Network; Non-Access-Stratum (NAS) functions related to Mobile Station (MS) in idle mode, Release 6, Mar. 2005.
3GPP Technical Specification (TS) 23.122, V7.1.0, Technical Specification Group Core Network; Non-Access-Stratum (NAS) functions related to Mobile Station (MS) in idle mode, Release 7, Mar. 2005.

(Continued)

*Primary Examiner*—Ajit Patel
*Assistant Examiner*—Khai M Nguyen
(74) *Attorney, Agent, or Firm*—Potomac Patent Group PLLC

(57) ABSTRACT

By evaluating a cell selection criterion S during scans for available public land mobile networks (PLMNs), a user equipment (UE) can avoid network service interruptions by not selecting PLMNs for which there exist no suitable cells. The cell selection criterion can be evaluated based on cell parameters either read during the PLMN selection procedure or locally stored before the PLMN selection procedure. It is possible to reduce the time required for PLMN scans and UE power consumption.

15 Claims, 5 Drawing Sheets

OTHER PUBLICATIONS

3GPP Technical Specification (TS) 25.304, V5.8.0, Technical Specification Group Radio Access Network; User Equipment (UE) procedures in idle mode and procedures for cell reselection in connected mode, Release 5, Mar. 2005.

3GPP Technical Specification (TS) 25.304, V6.5.0, Technical Specification Group Radio Access Network; User Equipment (UE) procedures in idle mode and procedures for cell reselection in connected mode, Release 6, Mar. 2005.

3GPP Technical Specification (TS) 43.022, V7.1.0, Technical Specification Group GSM/EDGE Radio Access Network; Functions related to Mobile Station (MS) in idle mode and group receive mode, Release 7, Jun. 2005.

PCT Written Opinion, mailed Aug. 29, 2006, in connection with International Application No. PCT/EP2006/003983.

PCT International Search Report, mailed Aug. 29, 2006, in connection with International Application No. PCT/EP2006/003983.

* cited by examiner

AVOIDANCE OF SERVICE INTERRUPTIONS IN VISITED PUBLIC LAND MOBILE NETWORK (VPLMNS)

This application claims the benefit of U.S. Provisional patent application Ser. No. 60/683,667 filed on May 23, 2005, the content of which is incorporated here by reference.

BACKGROUND

This application relates to wireless communications systems, and more particularly to improved selection of networks in such systems.

When a user equipment (UE), such as a mobile phone or mobile station (MS), is registered on a visited public land mobile network (VPLMN), it sometimes periodically searches for higher prioritized PLMNs, as described in Section 4.4.3.3 of Third Generation Partnership Project (3GPP) Technical Specification (TS) 23.122, Non-Access-Stratum (NAS) functions related to Mobile Station (MS) in idle mode, V6.4.0 (Rel. 6) and V7.1.0 (Rel. 7) (March 2005). It should be understood that citations of Release 6 and Release 7 specifications are not intended to exclude any other Releases.

U.S. Patent Application Publication No. US 2002/0119774 for "Method for PLMN Selection" by Johannesson et al. describes how a UE receives a list of data associated with networks neighboring the PLMN currently serving the MS from the base station (BS) of the PLMN currently serving the UE. A new PLMN to serve the UE can be selected based upon the list.

U.S. Patent Application Publication No. US 2004/0224689 for "Method for a Radiotelephone to Scan for Higher Priority Public Land Mobile Network" by Raghuram et al. describes how a radiotelephone can scan for available frequencies that are in use and supported by higher priority PLMNs and the radiotelephone.

The UE typically scans for higher prioritized PLMNs only if there are higher prioritized PLMNs in the same country as the VPLMN. In this process, the UE selects the highest prioritized available PLMN. For Universal Mobile Telecommunications System (UMTS) Terrestrial Radio Access (UTRA) Frequency Division Duplex (FDD) PLMNs, an "available PLMN" is a "PLMN for which the UE has found at least one cell and read its PLMN identity", according to 3GPP TS 25.304, User Equipment (UE) procedures in idle mode and procedures for cell reselection in connected mode, V5.8.0 (Rel. 5) and V6.5.0 (Rel. 6) (March 2005).

When the highest prioritized available PLMN has been selected, the UE leaves the current VPLMN and starts searching for a suitable cell belonging to this highest prioritized PLMN. One of the conditions for a suitable UTRA-network cell is fulfillment of its cell selection criterion S, which places requirements on received signal strength and quality. For UTRA, the cell selection criterion is defined in Section 5.2.3.1.2 of 3GPP TS 25.304, which provides that the cell selection criterion S is fulfilled when parameters $S_{rxlev}$ and $S_{qual}$ are greater than zero, for FDD cells, or when $S_{rxlev}$ is greater than zero, for time division duplex (TDD) cells. It will be understood that other cell selection criteria can be used for the methods and apparatus described in this application. It will also be understood that these methods and apparatus can be used for communication systems other than UTRA, for example as described in 3GPP TS 43.022, Functions related to Mobile Station (MS) in idle mode and group receive mode (Release 7), V7.1.0 (June 2005).

$S_{rxlev}$ is a cell selection receive level value (in dB) that is the difference between a parameter $Q_{rxlevmeas}$ and the sum of the parameters $Q_{rxlevmin}$ and $P_{compensation}$. $Q_{rxlevmeas}$ is the measured cell receive level value, which is received signal code power (RSCP) on a common pilot channel (CPICH) for FDD cells (in dBm) and RSCP on a primary common control physical channel (P-CCPCH) for TDD cells (in dBm). $Q_{rxlevmin}$ is the minimum required receive level in the cell (in dBm). $P_{compensation}$ is max(UE_TXPWR_MAX_RACH–P_MAX, 0) in dB. UE_TXPWR_MAX_RACH is the maximum transmit power level a UE may use when accessing the cell on the random access channel (RACH) (read in system information) (in dBm), and P_MAX is the maximum radio frequency (RF) output power of the UE (in dBm). Of course it will be understood that other measurement units can be used for the parameters described in this application.

$S_{qual}$ is a cell selection quality value (in dB) for FDD cells that is the difference between the parameters $Q_{qualmeas}$ and $Q_{qualmin}$. The parameter $Q_{qualmeas}$ is the measured cell quality value, i.e., the quality of the received signal expressed in CPICH $E_c/N_0$ (in dB) for FDD cells. $Q_{qualmin}$ is the minimum required quality level in the cell (in dB) for FDD cells.

According to the above described behavior, the UE may select a PLMN for which no suitable cell exists. When this happens, the UE will continue the search for cells belonging to the selected PLMN on all supported frequencies and radio access technologies (RATs). A PLMN may support more than one radio access technology, and the UE determines what type of radio carrier to search for when attempting to select a specific PLMN (e.g., GSM, UMTS, GSM COMPACT, etc.). When this search is completed (often without finding a suitable cell), the UE will select another available PLMN, if found, and try to find a suitable cell on this other PLMN. A typical scenario is that the original VPLMN is then re-selected, and the UE starts looking for a suitable cell on the original VPLMN.

Among the consequences of this behavior is the UE will not be able to provide normal network services (e.g., incoming or outgoing voice calls) from the time the available PLMN was selected until the UE is back on the original cell on the VPLMN. In addition, the UE will spend significant energy searching for suitable cells and performing PLMN scans, without any benefit for the user or the network operators. Furthermore, the user will perceive worse than actual network coverage, since the UE will sometimes behave as if there is no coverage while in reality the VPLMN is available.

SUMMARY

By evaluating a cell selection criterion S during PLMN scan(s), it is possible to avoid network service interruptions by not selecting PLMNs for which there exist no suitable cells. By locally storing cell parameters, it is also possible to reduce the time required for PLMN scans since the UE can avoid receiving broadcast information during the PLMN scan, thereby reducing UE power consumption.

In accordance with one aspect of this invention, there is provided a method in a UE of selecting among available PLMNs, each PLMN including at least one cell. The method includes the steps of scanning for available PLMNs; picking an available PLMN; reading system information of at least one cell in the picked available PLMN; evaluating a cell selection criterion based on the read system information; repeating the picking, reading, and evaluating steps for remaining available PLMNs; and selecting an available PLMN having a highest priority and having a cell fulfilling the cell selection criterion.

In accordance with another aspect of this invention, there is provided an apparatus in a UE equipment for selecting among available PLMNs, each PLMN including at least one cell. The apparatus includes a processor configured to scan for available PLMNs; to pick an available PLMN; to read system information of at least one cell in the picked available PLMN; to evaluate a cell selection criterion based on the read system information; to repeat the picking, reading, and evaluating for remaining available PLMNs; and to select an available PLMN having a highest priority and having a cell fulfilling the cell selection criterion.

In accordance with a further aspect of this invention, there is provided a computer-readable medium containing a computer program for causing a receiver to select among available PLMNs, each PLMN including at least one cell. The computer program implements the steps of scanning for available PLMNs; picking an available PLMN; reading system information of at least one cell in the picked available PLMN; evaluating a cell selection criterion based on the read system information; repeating the picking, reading, and evaluating steps for remaining available PLMNs; and selecting an available PLMN having a highest priority and having a cell fulfilling the cell selection criterion.

BRIEF DESCRIPTION OF THE DRAWINGS

The several features, objects, and advantages of this invention will be understood by reading this description in conjunction with the drawings, in which.

DETAILED DESCRIPTION

Figure 1:
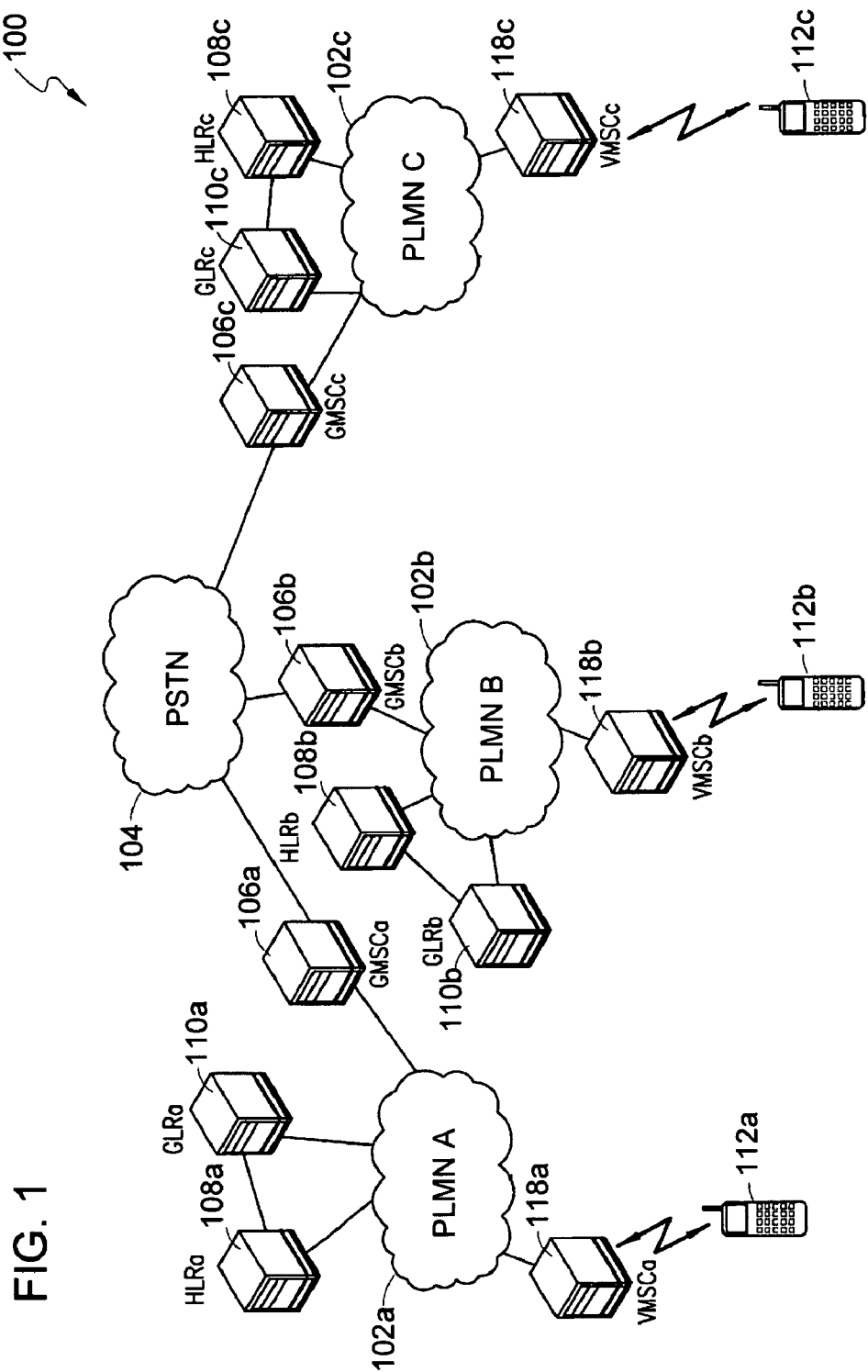
FIG. 1 depicts a communication network that includes a plurality of public land mobile networks.

FIG. 1 is a diagram of an exemplary communication network 100 that includes a plurality of PLMNs 102a, 102b, 102c. It will be recognized that FIG. 1 depicts the PLMNs 102 as non-overlapping, but this is done only for clarity; in general, PLMNs can overlap to varying geographical extents. A conventional public switched telephone network (PSTN) 104 interfaces with the PLMNs through respective gateway mobile services switching centers (GMSCs) 106a, 106b, 106c. The PLMNs 102a, 102b, 102c have respective home location registers (HLRs) 108a, 108b, 108c and gateway location registers (GLRs) 110a, 110b, 110c. The HLRs maintain subscription data and keep track of the current locations of user equipments (UEs), such as mobile telephones or terminals, of the PLMNs' mobile subscribers, such as the UEs 112a, 112b, 112c. Each GLR maintains subscription data of mobile subscribers associated with other networks, i.e., UEs that are "visiting" the respective PLMN.

For clarity, if the UE 112a subscribes to the PLMN 102a, the PLMN 102a is called the "home PLMN" of the UE 112a; in general, a home PLMN is a PLMN where the mobile country code (MCC) and mobile network code (MNC) of the PLMN identity are the same as the MCC and MNC of the UE. If the UE 112 roams to another PLMN 102b, 102c, then those PLMNs are called VPLMNs. A PLMN that provides services to a UE is called the UE's "serving PLMN". As UEs travel from their home PLMNs into geographic areas served by other PLMNs, the UEs initiate a location registration procedure with the respective VPLMN's visited mobile switching centers (VMSCs) 118a, 118b, 118c. The VMSCs inform the HLRs through the GLRs of the locations of the roaming mobile subscribers. For example, as UE 112a travels into the geographic area serviced by PLMN 102b, it registers with VMSC 118b and GLR 110b, which inform HLR 108a of the current location of UE 112a.

The artisan will understand that the components and arrangement depicted in FIG. 1 are examples and should not be construed as limiting the components and arrangement of an actual communication network.

Each PLMN includes a respective number of base stations (not shown in FIG. 1) that are capable of communicating with the UEs. As explained above, under current communication system standards, a UE scans for a better PLMN based on criteria such as movement of the UE from one PLMN to another or lapse of a set period of time.

Figure 2:
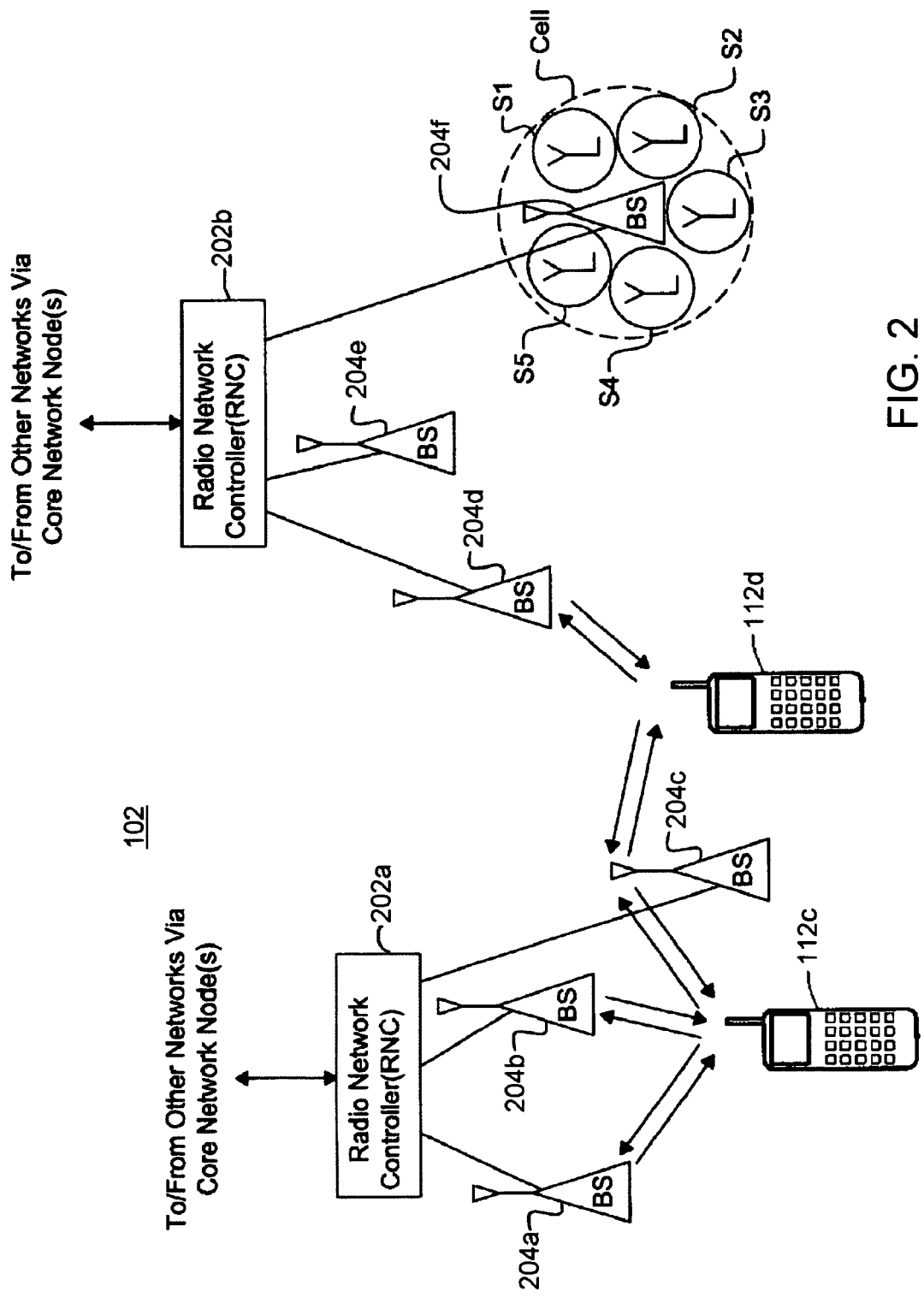
FIG. 2 depicts a public land mobile network that includes a plurality of base stations.

FIG. 2 depicts a PLMN 102, which may be, for example, a WCDMA communication system. Radio network controllers (RNCs) 202a, 202b control various radio network functions, including for example radio access bearer setup, diversity handover, etc. More generally, each RNC directs UE calls via the appropriate BSs, which communicate with UEs 112c, 112d through downlink (i.e., base-to-mobile, or forward) and uplink (i.e., mobile-to-base, or reverse) channels. RNC 202a is shown coupled to BSs 204a, 204b, 204c, and RNC 202b is shown coupled to BSs 204d, 204e, 204f. Each BS, which is called a Node B in 3GPP parlance, serves a geographical area that can be divided into one or more cell(s). BS 204f is shown as having five antenna sectors S1-S5, all or some of which can be said to make up the cell of the BS 204f. The BSs are coupled to their corresponding RNCs by dedicated telephone lines, optical fiber links, microwave links, etc. As described above, both RNCs 202a, 202b are connected with external networks such as the PSTN, the Internet, etc. through one or more core network nodes, such as an MSC and/or a packet radio service node (not shown).

In many PLMNs, each BS transmits predetermined pilot symbols on the UE's downlink physical channel (DPCH) and on a CPICH. The UE typically uses the DPCH and/or CPICH pilot symbols in estimating the impulse response of the radio channel to the BS and in estimating the signal-to-noise ratio (SNR) of the cell.

Figure 3:
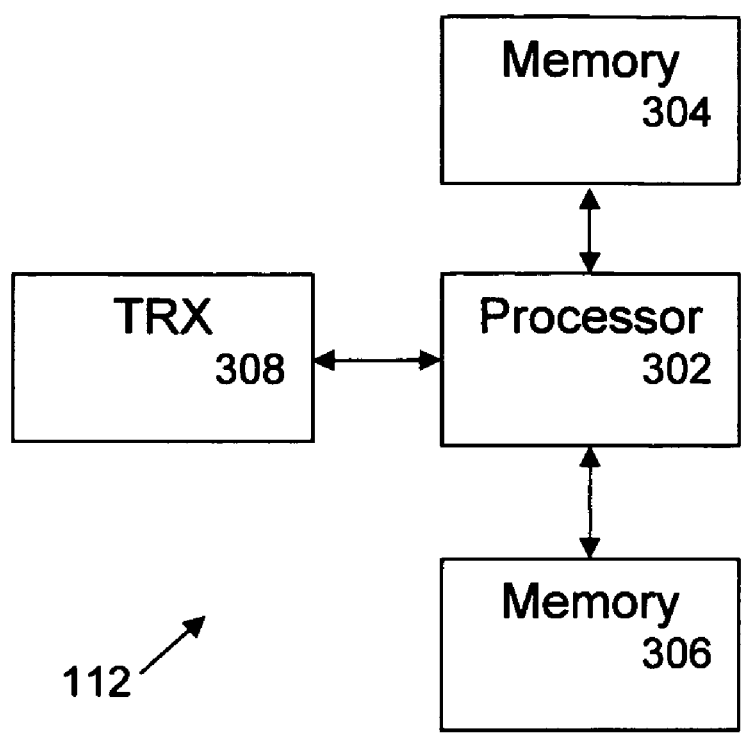
FIG. 3 is a block diagram of a mobile station.

FIG. 3 depicts a UE 112 that communicates through a wireless link with a BS 204 of a PLMN 102. Information transmitted from the BS 204 to the UE 112 enables the UE 112 to select the PLMN and may be stored in a suitable memory or memories in the UE 112. The information may either be transmitted by the BS 204 on a suitable broadcast channel or selectively transmitted to the UE 112, for example, during registration of the UE with the serving PLMN. In addition to the identity of neighboring PLMNs, the information may include identification of neighboring cells of the current serving cell (within the same PLMN), RATS information that is used in the selection of the PLMN in, for example, a UMTS network, and the MCCs of countries located near the PLMN 102.

Among other things, the UE 112 includes one or more programmable processors 302 or suitable logic that processes information stored in one or more memories 304, 306. As explained in more detail below, the stored information may include system information of one or more cells and lists of available and neighboring PLMNs, which a processor 302 can use in determining and selecting a better PLMN, if available. It will be appreciated that the processor 302 typically includes timers, etc. that facilitate its operations. Transceiver (TRX) circuitry 308 provides for the reception and transmission of DPCH, CPICH, and similar signals on the link between the UE 112 and the BS 204. Similarly suitable transceiver circuitry is provided in the BS 204.

Evaluate Cell Selection Criterion During PLMN Scan

A simple description of the conventional PLMN selection procedure carried out in a UE is this:

scan for available PLMNs;
select the highest prioritized available PLMN; and
search for and select a suitable cell in the selected PLMN.

If a suitable cell is not found, the UE starts the selection procedure anew, scanning for available PLMNs, but this time the PLMN for which there was no suitable cell is not considered.

The conventional PLMN selection procedure suffers from the drawbacks noted above. Not only can it take an unacceptably long time to search for and select a suitable cell in a selected PLMN, but the UE may leave its current PLMN and search for a suitable cell on a PLMN where a suitable cell does not exist.

Figure 4:
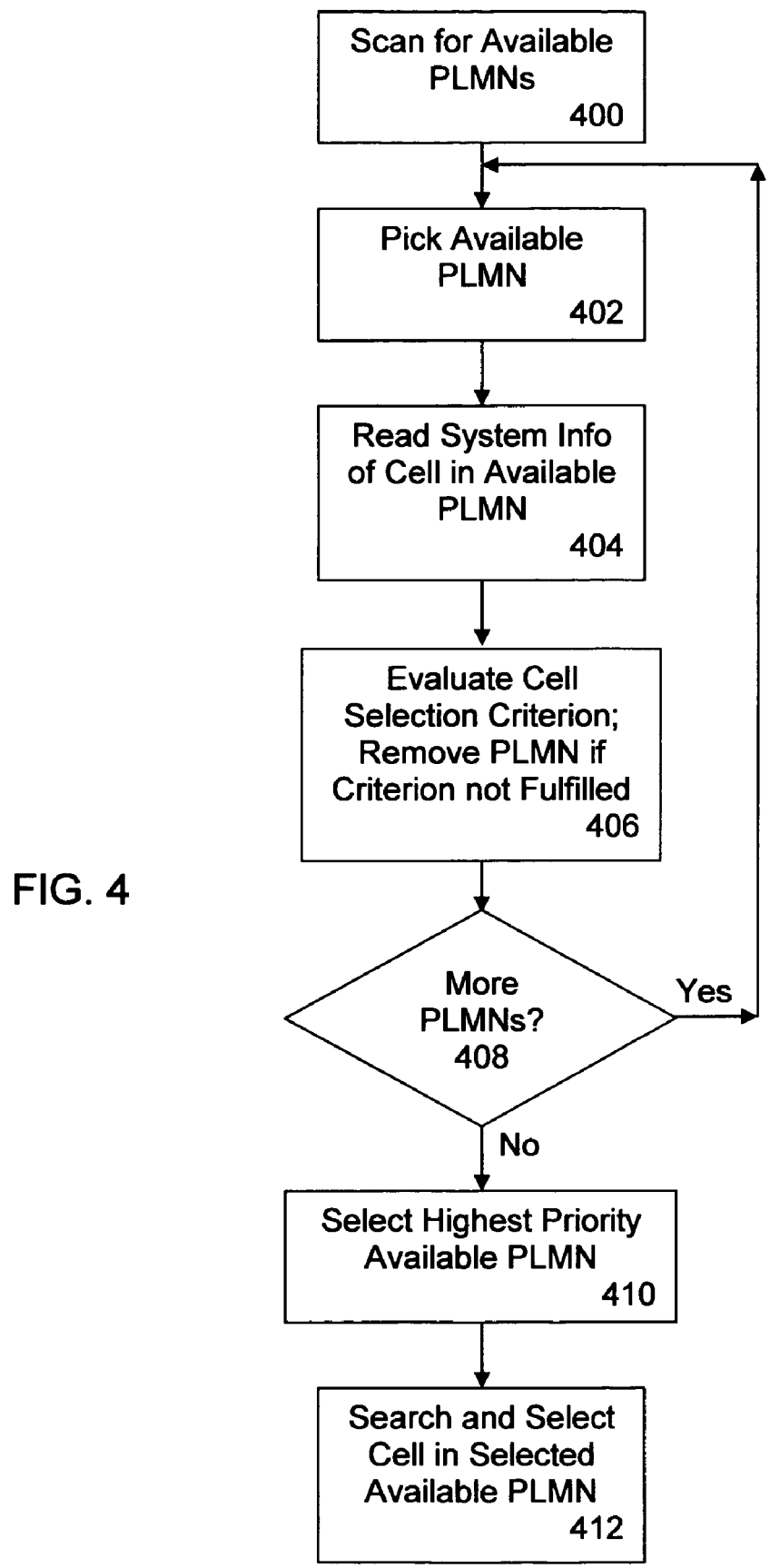
FIG. 4 is a flow chart of a method of selecting a PLMN that is in accordance with aspects of this invention.

To avoid selecting a higher prioritized available PLMN for which there is no suitable cell, the conventional PLMN selection procedure implemented by the UE's processor 302 can be replaced by a method of PLMN selection that is illustrated by the flow chart in FIG. 4. Among other things, this method advantageously avoids network service interruptions by avoiding selection of PLMNs for which there exist no suitable cells.

In step 400, the UE scans for available PLMNs and thereby determines a list of one or more available PLMNs. In step 402, the UE picks an available PLMN, and in step 404, the UE reads system information of at least one cell in the picked available PLMN. In reading the system information of a cell that is transmitted on a broadcast channel in the cell, the UE obtains the parameters, such as $Q_{qualmin}$, $Q_{rxlevmin}$, and UE_TXPWR_MAX_RACH, that are valid for the particular cell and that are needed to evaluate a cell selection criterion S as described above. In step 406, the cell selection criterion is evaluated based on the read system information, and if the cell selection criterion is not fulfilled, the PLMN is removed from the list of available PLMNs.

The artisan will recognize that the steps 404 and 406 are not carried out in the conventional PLMN selection procedure. Here, it is only important for steps 404 and 406 to be performed for each available PLMN before the UE (finally) selects a PLMN, which typically becomes the serving PLMN after registration. This may be done by including steps 404, 406 early in an otherwise conventional PLMN selection procedure. It may be noted that if an available PLMN has more than one suitable cell, it is not necessary to perform steps 404 or 406 for every one of the suitable cells.

If it is decided that more available PLMNs remain to be picked (Yes in step 408), the flow returns to step 402, and the picking, reading, and evaluating steps are repeated for the remaining available PLMNs. If it is decided that no available PLMNs remain (No in step 408), the available PLMN having the highest priority is selected (step 410). Through the operation of step 406, for example, that PLMN has a cell that is suitable, i.e., a cell that fulfills the cell selection criterion.

After selecting the PLMN, the UE searches for a cell in the selected PLMN (step 412). This search may but need not begin with the cell whose system information was read and used for evaluation of the cell selection criterion.

PLMN selection methods as illustrated by FIG. 4 have many advantages. For example, when a UE is on a PLMN and also on the border of a cell belonging to a higher prioritized PLMN, it may repeatedly "see" that cell without being allowed to select it because the received signal strength and quality do not fulfill selection criterion S. PLMN scans may typically occur at six-minute intervals, and under such circumstances, it is time- and power-consuming for the UE to select the higher prioritized PLMN only to find after evaluation of the cell selection criterion S that the "seen" cell is not suitable.

Evaluate Cell Selection Criterion During PLMN Scan Using Stored Cell Parameters

Some implementations of the PLMN scan may not allow system information to be read when the UE is camped on a cell, e.g., a GSM cell, and this prevents evaluation of the cell selection criterion S during PLMN selection. It will be understood that a UE "camps" on a cell after the UE has completed the cell selection/reselection process and has selected the cell from which it plans to receive available services.

Because the broadcast system information does not change often, it can be advantageous for the UE to read the system information when possible and then store the information in its local memories 304, 306. Thus, the conventional method of selecting a PLMN is advantageously replaced by a method of PLMN selection that is illustrated by the flow chart in FIG. 5.

In step 500, the UE scans for available PLMNs and thereby determines a list of one or more available PLMNs, and in step 502, the UE picks an available PLMN from the list. In step 504, the UE determines whether system information for a cell or cells in the picked available PLMN is stored in the UE memory. If system information is not stored (No in step 504), the UE reads system information of at least one cell in the picked available PLMN (step 506), and the UE may store the read information (step 508). It may be noted that if an available PLMN has more than one readable cell, it is not necessary to perform step 506 for every one of the readable cells. If system information is stored in the UE (Yes in step 504), the stored system information is retrieved (step 510). In either case, the system information is used to evaluate the cell selection criterion S (step 512).

In reading the system information of a cell that is transmitted on a broadcast channel in the cell or in retrieving previously read system information, the UE obtains the parameters, such as $Q_{qualmin}$, $Q_{rxlevmin}$, and UE_TXPWR_MAX_RACH, that are valid for the respective cell and that are needed to evaluate the cell selection criterion S as described above. In step 512, the cell selection criterion is evaluated based on the read or retrieved system information, and if the cell selection criterion is not fulfilled, the selected available PLMN is removed from the list of available PLMNs.

If it is decided that more available PLMNs remain to be picked (Yes in step 514), the flow returns to step 502. If it is decided that no available PLMNs remain (No in step 514), the available PLMN having the highest priority is selected (step 516). Through the operation of step 512, for example, that PLMN has a cell that is suitable, i.e., a cell that fulfills the cell selection criterion.

After selecting the PLMN, the UE searches for a cell in the selected PLMN (step 518). This search may but need not begin with the cell whose system information was read and used for evaluation of the cell selection criterion.

The artisan will again recognize that the steps 506, 510, and 512 are not carried out in the conventional PLMN selection procedure and that it is important for those steps to be performed for each available PLMN before the UE (finally) selects a PLMN, which typically becomes the serving PLMN after registration. This may be done by including those steps in the first step or so of a conventional PLMN selection procedure.

Figure 5:
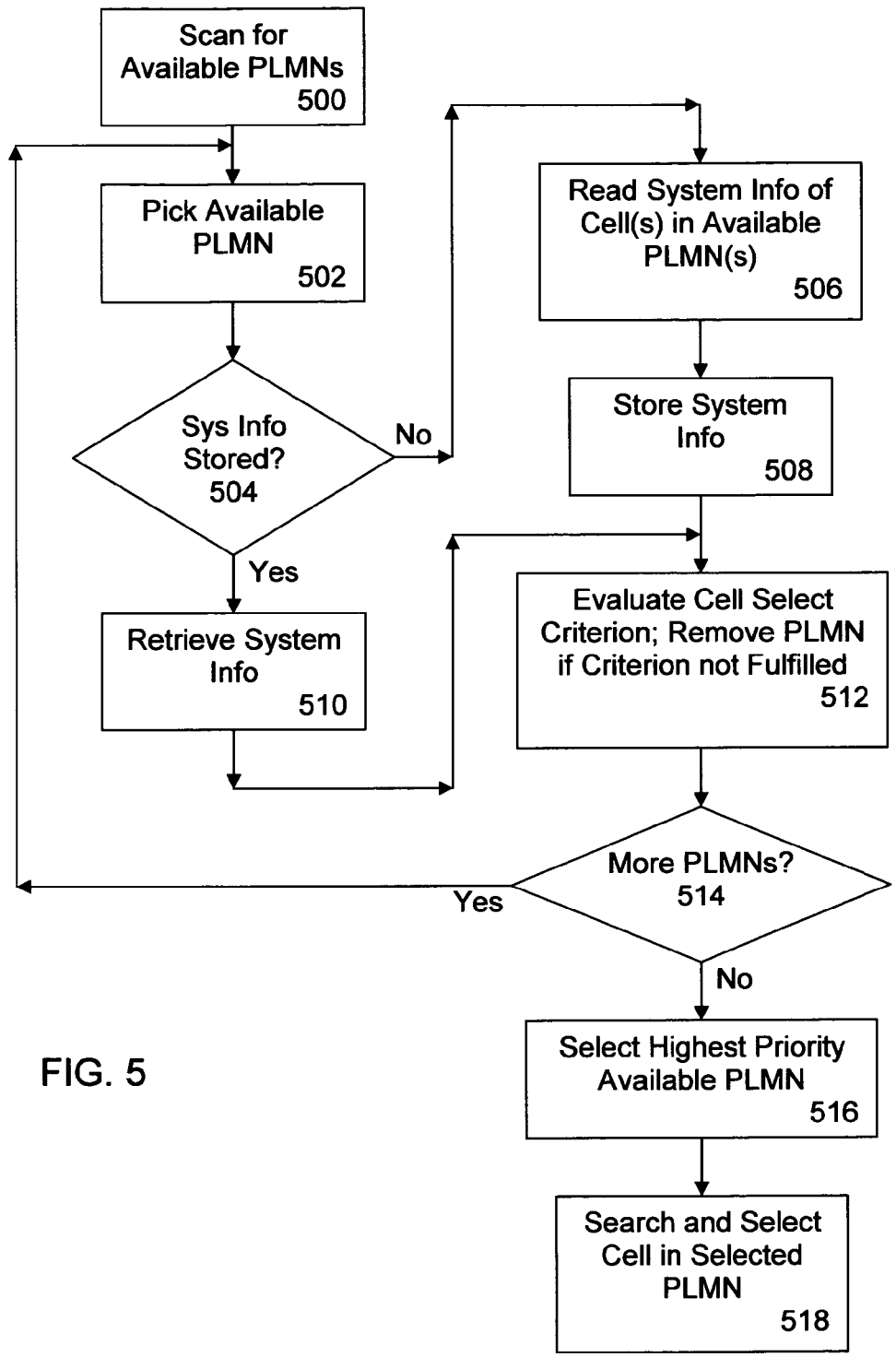
FIG. 5 is a flow chart of another method of selecting a PLMN that is in accordance with aspects of this invention.

As described above, the UE starts by scanning for available PLMNs when it is time for PLMN selection. It will be understood that it is possible to evaluate the cell selection criterion as each available PLMN is found during this scan, or to evaluate after all of the available PLMNs have been found as depicted in FIGS. 4 and 5.

The broadcast cell parameters and other system information may advantageously be stored in a UE's memory 304, 306 according to one of at least the following two alternative organizations:

PLMN and UARFCN, where UARFCN is the UTRA Absolute Radio Frequency Channel Number cited in 3GPP TS 21.905, Vocabulary for 3GPP Specifications, V6.8.0 (Rel. 6) (March 2005); and PLMN and UARFCN and Primary Scrambling Code. A processor 302 can simply implement such organizations in the memories 304, 306 simply by storing each record in association with one or more of the PLMN identification number, UARFCN, and Primary Scrambling Code number, all of which are integers.

To avoid the system information's becoming out of date, the storage can further either be organized as first-in, first-out (FIFO) in the memories 304, 306 with a limited number of elements or be supervised by a timer such that stored system information is deleted after lapse of a period of time. It is currently believed that the better alternative is supervision by a timer as this can cope with possibly unique parameters per cell and minimize the risk of using obsolete data. It can also take care of possible reuse of cell identity (UARFCN/Primary Scrambling Code).

It will be recognized that apparatus and methods such as those illustrated by FIGS. 3-5 share many of the same advantages, including for example avoidance/reduction of service interruption for UEs that are in a VPLMN and that detect a higher prioritized PLMN whose cell(s) are too weak to qualify as suitable cells; and reduction of consumed energy required to evaluate cell suitability, during scans for higher prioritized PLMNs when on a VPLMN.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a user equipment of selecting among available public land mobile networks (PLMNs), each PLMN including at least one cell, comprising the steps of:
    scanning for available PLMNs when the user equipment is connected to a visited public land mobile network (VPLMN);
    picking an available PLMN for evaluation;
    reading system information of at least one cell in the picked available PLMN, wherein the system information includes a minimum required quality level in the cell, a minimum required receive level in the cell, and a maximum transmit power level to access the cell on a random access channel;
    evaluating a cell selection criterion based on the read system information;
    repeating the picking, reading, and evaluating steps for remaining available PLMNs; and
    selecting an available PLMN having a highest priority and having a cell fulfilling the cell selection criterion;
    wherein the scanning step includes a step of determining a list of available PLMNs, and the evaluating step includes a step of removing a picked available PLMN from the list if the cell selection criterion is not fulfilled by the at least one cell in the picked available PLMN.

2. The method of claim 1, further comprising the step of, after selecting the available PLMN having the highest priority, searching for a cell in the selected PLMN.

3. The method of claim 1, wherein the reading step includes reading the system information from a memory, the system information having been stored in the memory before performing the scanning step.

4. The method of claim 3, wherein the system information is stored in the memory according to respective PLMN and at least one of absolute radio frequency channel number and primary scrambling code.

5. The method of claim 3, wherein the system information stored in the memory is either deleted after lapse of a period of time or stored according to first-in, first-out.

6. An apparatus in user equipment for selecting among available public land mobile networks (PLMNs), each PLMN including at least one cell, comprising:
- a processor configured to scan for available PLMNs when the user equipment is connected to a visited public land mobile network (VPLMN); to pick an available PLMN for evaluation; to read system information of at least one cell in the picked available PLMN, wherein the system information includes a minimum required quality level in the cell, a minimum required receive level in the cell, and a maximum transmit power level to access the cell on a random access channel; to evaluate a cell selection criterion based on the read system information; to repeat the picking, reading, and evaluating for remaining available PLMNs; and to select an available PLMN having a highest priority and having a cell fulfilling the cell selection criterion; and
- wherein the processor is configured, in scanning for available PLMNs, to determine a list of available PLMNs; and in evaluating the cell selection criterion, to remove a picked available PLMN from the list if the cell selection criterion is not fulfilled by the at least one cell in the picked available PLMN.

7. The apparatus of claim 6, wherein the processor is further configured to search, after selecting the available PLMN having the highest priority, for a cell in the selected PLMN.

8. The apparatus of claim 6, wherein the processor is configured, in reading system information, to read the system information from a memory, the system information having been stored in the memory before scanning for available PLMNs.

9. The apparatus of claim 8, wherein the processor is configured to store system information in the memory according to respective PLMN and at least one of absolute radio frequency channel number and primary scrambling code.

10. The apparatus of claim 8, wherein the processor is configured either to delete system information stored in the memory after lapse of a period of time or to store system information in the memory according to first-in, first-out.

11. Non-transitory computer-readable medium containing a computer program for causing a receiver to select among available public land mobile networks (PLMNs), each PLMN including at least one cell, the computer program implementing the steps of:
- scanning for available PLMNs when the user equipment is connected to a visited public land mobile network (VPLMN);
- picking an available PLMN for evaluation;
- reading system information of at least one cell in the picked available PLMN, wherein the system information includes a minimum required quality level in the cell, a minimum required receive level in the cell, and a maximum transmit power level to access the cell on a random access channel;
- evaluating a cell selection criterion based on the read system information; repeating the picking, reading, and evaluating steps for remaining available PLMNs; and
- selecting an available PLMN having a highest priority and having a cell fulfilling the cell selection criterion; and
- wherein the scanning step includes a step of determining a list of available PLMNs, and the evaluating step includes a step of removing a picked available PLMN from the list if the cell selection criterion is not fulfilled by the at least one cell in the picked available PLMN.

12. Non-transitory computer-readable medium of claim 11, wherein the computer program further implements the step of, after selecting the available PLMN having the highest priority, searching for a cell in the selected PLMN.

13. Non-transitory computer-readable medium of claim 11, wherein the reading step includes reading the system information from a memory, the system information having been stored in the memory before performing the scanning step.

14. Non-transitory computer-readable medium of claim 13, wherein the system information is stored in the memory according to respective PLMN and at least one of absolute radio frequency channel number and primary scrambling code.

15. Non-transitory computer-readable medium of claim 13, wherein the system information stored in the memory is either deleted after lapse of a period of time or stored according to first-in, first-out.

* * * * *

UNITED STATES PATENT AND TRADEMARK OFFICE
CERTIFICATE OF CORRECTION

| | |
|---|---|
| PATENT NO. | : 7,773,990 B2 |
| APPLICATION NO. | : 11/351222 |
| DATED | : August 10, 2010 |
| INVENTOR(S) | : Ekstedt et al. |

It is certified that error appears in the above-identified patent and that said Letters Patent is hereby corrected as shown below:

On the Title Page, in Field (54), in Title, in Column 1, Line 3, delete "NETWORK" and insert -- NETWORKS --, therefor.

In Column 1, Line 3, delete "NETWORK" and insert -- NETWORKS --, therefor.

Signed and Sealed this
Fifteenth Day of February, 2011

David J. Kappos
*Director of the United States Patent and Trademark Office*